Feb. 17, 1953    D. D. KLINE ET AL    2,628,705
SLATTED CONVEYER
Filed June 10, 1948    3 Sheets-Sheet 1
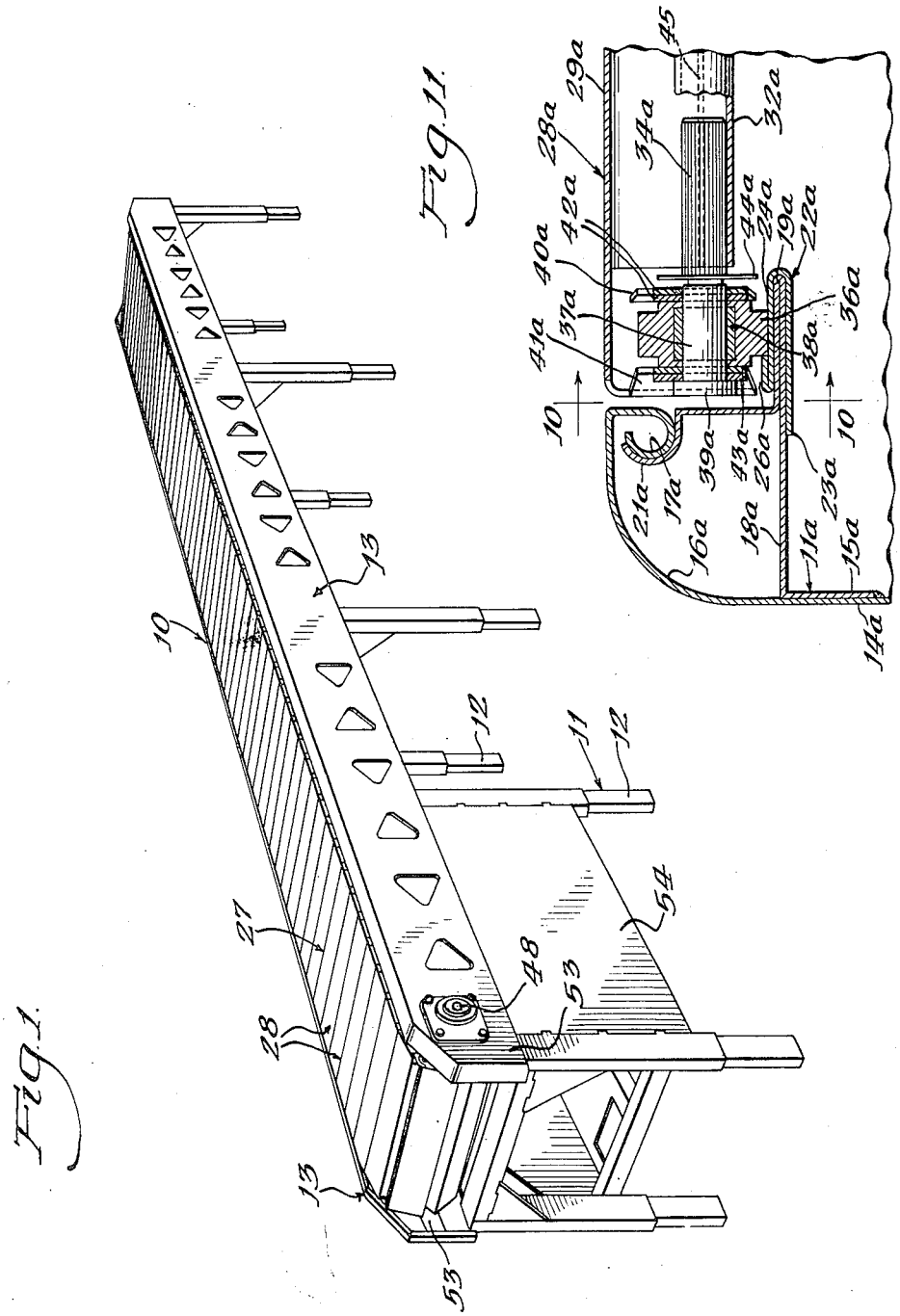
Inventors:
Donald D. Kline
Edward N. Michna
By: Wallace and Cannon
Attorneys

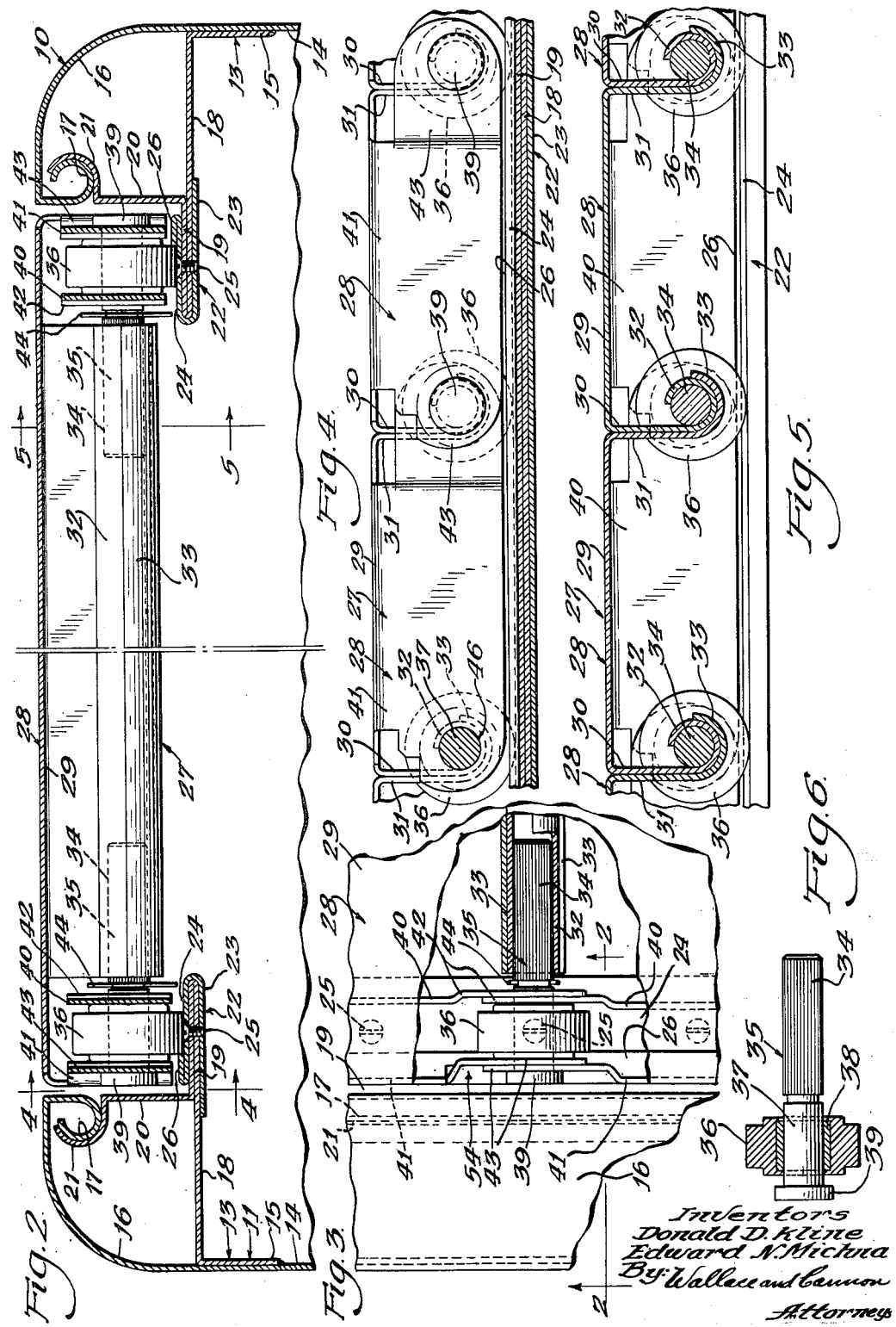

Feb. 17, 1953     D. D. KLINE ET AL     2,628,705
SLATTED CONVEYER
Filed June 10, 1948     3 Sheets-Sheet 3
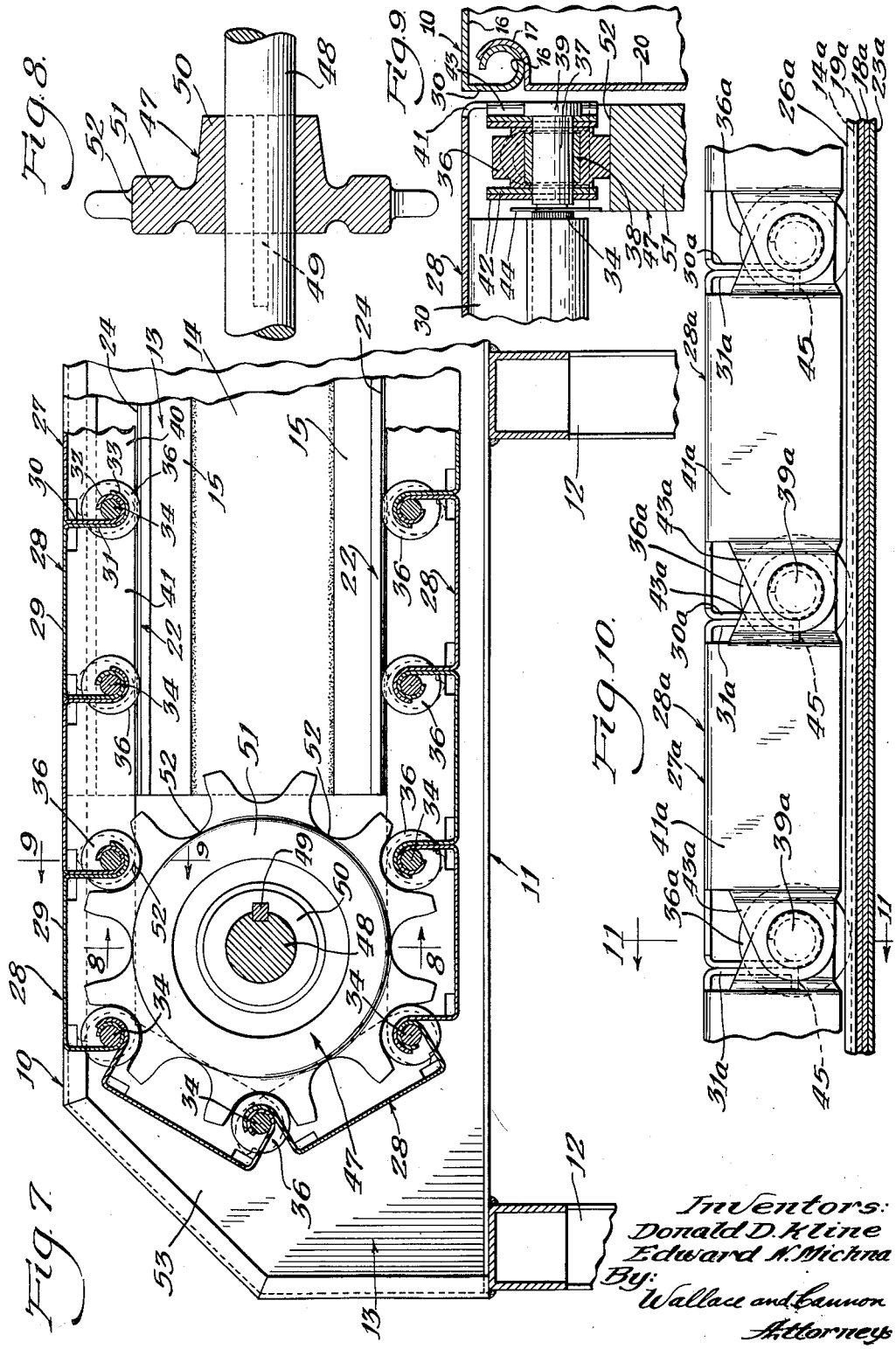
Inventors:
Donald D. Kline
Edward N. Michna
By: Wallace and Cannon
Attorneys Patented Feb. 17, 1953

2,628,705

UNITED STATES PATENT OFFICE 2,628,705

SLATTED CONVEYER

Donald Kline, Aurora, and Edward N. Michna, Chicago, Ill., assignors, by mesne assignments, to Peterson Products Corporation, Chicago, Ill., a corporation of Illinois Application June 10, 1948, Serial No. 32,245

13 Claims. (Cl. 198—195)

This invention relates to conveyors. More particularly, this invention relates to endless conveyors of the relatively light sheet metal type which may be used in factories and other places in which a relatively light and inexpensive endless conveyor unit may be desired.

Endless conveyors have been made heretofore embodying a conveyor chain or belt comprised of a plurality of link units or sections each including a deck portion and with the deck portions of adjacent link units or sections having generally tubular interfitting rolled end edge portions providing hinges by means of which the said chain link units or sections are hingedly connected together. In such prior endless conveyors the driving of the endless chain or belt has been affected by the engagement of the generally tubular interfitting rolled end edge hinge portions thereof in the recesses of a power-driven driving sprocket arranged at one end of the conveyor. However, this arrangement has been subject to certain objectionable characteristics and among these has been the fact that the driving engagement between the driving sprocket and the generally tubular interfitting rolled end edge hinge portions of the conveyor chain link units or sections causes a strain to be exerted upon the said hinge portions which tends to distort the same and cause binding of these parts and faulty operation thereof.

Accordingly, an object of the present invention is to provide a new and improved endless conveyor structure in which the endless conveyor belt or chain is driven by engagement of anti-friction rollers, upon which the endless chain or belt travels, in the recesses of the driving sprocket rather than by engagement of the generally tubular interfitting rolled edge hinge portions of the conveyor chain in the recesses of the driving sprocket.

Other objects of the present invention are to provide an endless conveyor in which the endless belt or chain carrying anti-friction rollers upon which the endless belt or chain is mounted and in which each of the anti-friction rollers is mounted upon a short supporting shaft having a knurled portion which is frictionally driven into and mounted in position of use in a corresponding one of the generally tubular rolled edge hinge connections between two adjacent chain or belt link units or sections; to provide an endless conveyor structure in which the parts of the supporting frame of the new endless conveyor structure are constructed and arranged to provide novel combination guideways and trackways for the anti-friction rollers upon which the endless chain or belt travels; and to provide the endless chain or belt link units or sections with depending side flanges each of which has an inwardly offset portion providing a recess and in which heads of the supporting shafts for the anti-friction rollers are disposed in the said recesses as they travel along the said combination guideways and trackways are thereby prevented from engaging obstructions which would exert a strain upon and tend to distort the anti-friction roller-supporting shafts while, at the same time, the safety factor of the new endless conveyor structure is enhanced since the heads of the anti-friction roller supporting shafts, and other movable parts, including the anti-friction rollers, will not come into contact with the workers' hands or clothing as the endless chain or belt is operated and the anti-friction rollers supporting the said endless chain or belt travel along the said combination trackways and guideways; and to provide an endless conveyor structure in which the anti-friction roller-supporting shafts and the anti-friction rollers mounted thereon are readily mounted in position of use and may be readily removed for replacement and repair.

Other objects will appear hereinafter.

Fig. 1 is a prospective view of an endless conveyor structure embodying a preferred form of the present invention;

Fig. 2 is a fragmentary transverse vertical sectional view of the endless structure conveyor shown in Fig. 1 illustrating the novel combination trackways and guideways embodied therein and the arrangement of the anti-friction rollers therein and the mounting of the anti-friction rollers upon their supporting shafts;

Fig. 3 is a fragmentary plan view, partly in section, illustrating the construction and mounting of one of the anti-friction rollers embodied in the new endless conveyor structure;

Fig. 4 is a view, on line 4—4 in Fig. 2, partly in section and partly in elevation, illustrating the hinge connections between the chain link units or sections and the mounting of the anti-friction rollers;

Fig. 5 is a fragmentary vertical sectional view on line 5—5 in Fig. 2;

Fig. 6 is a detail view, partly in section and partly in elevation, illustrating the construction and mounting of one of the anti-friction rollers embodied in the endless conveyor structure of the present invention;

Fig. 7 is a fragmentary view of the new endless conveyor, partly in section and partly in elevation, illustrating the manner in which the endless chain or belt is driven by driving engagement of the anti-friction rollers in the recesses formed in the periphery of the conveyor-driving sprocket;

Fig. 8 is a sectional view on line 8—8 in Fig. 7 illustrating the construction of the driving sprocket and its mounting upon its supporting shaft;

Fig. 9 is a sectional detail view, on line 9—9 in Fig. 7, illustrating the mounting of one of the anti-friction rollers and the manner in which the anti-friction rollers engage in the recesses formed in the periphery of the conveyor-driving sprocket to effect the operation of driving the endless conveyor chain or belt;

Fig. 10 is a fragmentary side elevational view, partly in section, on line 10—10 in Fig. 11, illustrating a modified form of the hinge connection between the chain link units or sections which may be embodied in the new endless conveyor structure; and Fig. 11 is a sectional detail view on line 11—11 in Fig. 10.

A preferred embodiment of the new conveyor is illustrated in Figs. 1 to 9, inclusive, of the drawings, wherein it is generally indicated at 10, and comprises a supporting frame which is generally indicated at 11. The supporting frame 11 includes two rows of spaced supporting legs 12 which support and have their upper end portions attached in any suitable manner to, a pair of parallel horizontal side frame units, each of which is generally indicated at 13.

Each of the side frame units 13 includes (Fig. 2) an outer sheet metal frame member 14 and an inner sheet metal frame member 15 which is attached thereto in any suitable manner, as by welding. Each of the outer side frame members 14 includes an upper portion 16, which is arcuate or curved in cross sectional form (Fig. 2) and each of these portions 16 terminates in a convoluted or rolled edge portion 17 (Fig. 2). Each of the inner side frame members 15 includes a horizontally and inwardly extending flange 18, and each of these horizontally and inwardly extending flanges 18 has a return bend edge portion 19 which extends horizontally thereabove. An arm 20 extends vertically upwardly from each of the return bend edge portions 19 and each of these arms 20 terminates in a convoluted or rolled upper edge portion 21 which embraces and partially encircles the corresponding convoluted or rolled upper edge portion 17 exteriorly of the latter (Fig. 2) so as to tie the inner and outer frame members 15 and 14 of each of the side frame units 13 together, as shown in Fig. 2.

The supporting frame 11 of the new endless conveyor structure 10 includes a pair of tying members 22 each of which ties a pair of the inwardly and horizontally extending flanges 18 and 19 together. Each of these tying members 22 also cooperates with the corresponding horizontally extending flanges 18—19 to form a horizontally extending combination trackway and guideway for a row of anti-friction rollers 36 upon which the endless chain or belt embodied in the new endless conveyor travels, as will be described presently.

As shown in Fig. 2, each of the tying members 22 includes a lower horizontally extending arm or shelf 23, which is disposed below the corresponding horizontal flange 18, and a horizontally extending upper arm or track portion 24 which is disposed above and extends over the corresponding upper arm 19 of the flange 18. The parts 23 and 24 of each of the tying members 22 are attached to the corresponding inwardly extending flanges 18—19 by means of suitable fastening elements, such as screws 25, the heads of the screws 25 being arranged in suitable countersunk openings provided therefor in the track portions 24, (Fig. 2).

The upper arm or track portion 24 of each of the tying members 22 has a return bend portion 26 which extends inwardly thereover from the outer edge thereof and partially thereacross (Fig. 2). Each of these return bend portions 26 cooperates with the underlying track portion 24 to provide a combination trackway and guideway for a row of the anti-friction rollers 36 upon which the endless belt or chain of the new conveyor structure is mounted, as will be described hereinafter.

The endless belt or chain which is embodied in the new conveyor structure 10 is generally indicated at 27 in the drawings and includes a plurality of interconnected link units or sections, each of which is generally indicated at 28. Each of the link units or sections 28 includes a horizontal sheet metal upper deck section 29 having a depending flange 30 formed integrally therewith at one end thereof and having a depending flange 31 formed integrally therewith at its other end (Figs. 4 and 5). Each of the depending flanges 30 has a convoluted or rolled lower edge portion 32 and each of the depending flanges 31 has a convoluted or rolled lower end portion 33 which partially embraces or encircles the convoluted or rolled lower edge portion 32 of the depending flange 30 in the next adjacent link unit or section 28. Each pair of the interconnected rolled edges 32—33 provides a hinge connection between each two adjacent link units or sections 28 and, at the same time, each inner rolled edge portion 32 provides a housing for the reception of a knurled end portion 34 of a supporting shaft 35 each of which supports one of the anti-friction rollers 36.

Each row of anti-friction rollers 36 rides upon the horizontal track portions 24 of one of the combination trackways and guideways provided by the parts 18—19—22—23—24—25—26, and during movement thereof the anti-friction rollers 36 are guided at their outer sides by the adjacent inner edges of the guide portion 26 which are formed by the return bend portions of the upper arms or track portions 24 of the corresponding tying member 22—23—24 (Fig. 2).

As shown in Fig. 6, each of the anti-friction roller supporting shafts 35 has a smooth or unknurled bearing portion 37 upon which an anti-friction bushing 38 is rotatably mounted, each of the anti-friction bushings 38 being mounted within and being frictionally fitted to one of the anti-friction rollers 36.

Each of the anti-friction roller-supporting shafts 35 has an enlarged head portion 39 formed thereon at its outer end (Fig. 6). The mounting of each of the anti-friction roller-supporting shafts 35 is accomplished by frictionally fitting the knurled shaft portion 34 thereof in the outer end portion of the adjacent convoluted rolled edge hinge portion 33 (Fig. 3).

Each of the endless chain link units or sections 28 includes a pair of depending side flanges 41 formed integrally therewith. Each of the chain link units or sections 28 also includes a pair of interconnecting bars or link members 40 and each of these interconnecting bars or link members 40 is spaced inwardly from and relative to a corresponding one of the depending flanges 41 (Figs. 2 and 3). Each of the interconnecting bars or link members 40 has its end portions offset inwardly, as at 42 (Fig. 3), and each of the depending outer side flanges 41 has its end portions offset inwardly in spaced relationship with but parallel to the corresponding offset portion 42 of the adjacent interconnecting bars or link members 40.

The inwardly offset portions 42 of the interconnecting bars or link members 40 in each two adjacent link units or sections 28 are arranged in overlapping side-by-side and parallel relationship and the inwardly offset portions 43 of the depending flanges 41 are likewise arranged in overlapping and side-by-side and parallel relationship, as shown in Figs. 2 and 3.

The overlapping portions 43 of the depending side flanges 41 of the link units or sections 28 are apertured, as at 46, Fig. 4, for the passage of the anti-friction roller-supporting shafts 35 and the offset portions 42 of the interconnecting bars or link members 40 are similarly apertured for the passage of the shafts 35.

A washer 44 may be mounted on each anti-friction roller-supporting shaft 35 between the knurled end portion 34 and the smooth bearing surface 37 thereof (Figs. 2, 3 and 9).

The new conveyor structure 10 includes a driving sprocket, generally indicated at 47 (Figs. 7, 8 and 9), which is arranged between the end portions 53 of the side frame units 13 of the new endless conveyor structure frame 11 (Figs. 1 and 7). The driving sprocket 47 is mounted upon a driving shaft 48 to which the driving sprocket 47 is suitably keyed, or otherwise fastened, as at 49 (Fig. 7). The driving shaft 48, on which the driving sprocket 47 is mounted, may be driven by any suitable power-driven conveyor-driving means (not shown) but which may be mounted within a suitable housing 54 provided therefor in one end portion of the conveyor frame structure 11 (Fig. 1).

The driving sprocket 47 includes a central hub portion 50, which is mounted on the driving shaft 48 (Figs. 7 and 8), and a substantially annular body 51 which is formed integrally with the hub 50 and which has a series of circumferentially spaced radially arranged recesses 52 formed in its peripheral edge for the reception of the anti-friction rollers 36 upon which the movable chain or belt structure 28 travels during movement thereof.

As shown in Fig. 7, the driving sprocket 47 is arranged between the end portions 53 of the side frame units 13 of the supporting frame 11 so that the upper run of the endless chain or belt 28 will ride off the combination trackways and guideways 22—24—26 (Fig. 2) onto the driving sprocket 47 and so that the lower run of the endless chain or belt 28 will ride onto corresponding combination trackways and guideways 22—24—26 which are arranged below the upper combination trackways and guideways 22—24—26 (Fig. 7).

The use and operation of the form of the new conveyor structure shown in Figs. 1 to 9, inclusive, of the drawings are as follows: The link units or sections 28 may be hingedly connected by telescopically interconnecting the convoluted or rolled edge portions 32 and 33 of the depending flanges 30 and 31 thereof, as shown in the drawings. The anti-friction rollers 36 may be mounted in position of use by arranging each of the anti-friction rollers 36 in position of use between the inwardly offset portions 42 and 43 of the depending side flanges 41 and the interconnecting bars or link members 40 and then driving the knurled end portion 34 of each of the anti-friction roller-supporting shafts 35 through the apertures 46 in the inwardly offset portions 43 of the depending side flanges 41, through one of the bushings 38, through suitable apertures in the offset portions 42 of the interconnecting link or bar members 40, and into the interior of the inner convoluted or rolled edge portion 32 of the corresponding hinge joint 32—33. The knurled portion 34 of each anti-friction roller-supporting shaft 35 is thus frictionally fitted into the outer end portion of the inner convoluted or rolled edge hinge portion 32 and is thereby securely but removably mounted in position of use therein.

When the parts are thus assembled the head portions 39 of the anti-friction roller-supporting shafts 35 are disposed outwardly of but adjacent to the inwardly offset portions 43 of the depending side flanges 41 of the chain link units or sections 28 and within the recessed portions 54 formed thereby in the outer depending side flanges 41 of the link units or sections 28 (Figs. 2 and 3).

When the driving shaft 48 for the driving sprocket 47 is rotated, by a suitable power-driven operating mechanism therefor, arranged in the housing 55 (but not shown), the movable link units or sections 28 of the endless conveyor chain or belt 27 will ride upon the two rows of anti-friction rollers 36 which, in turn, will ride upon the track portions 24 of the combination trackways and guideways formed by the parts 18—19—22—23—24—25—26 and during this operation the anti-friction rollers 36 are guided at their outer edges, and against lateral or shifting movement upon the trackways 24, by the inwardly extending guide flanges 26. (Fig. 2.)

As the upper run of the endless chain or belt section 27 and the anti-friction rollers 36 carried thereby travel off the upper combination trackways and guideways 18—19—22—23—24—25—26 onto the driving sprocket 47 (Fig. 7) the anti-friction rollers 36 ride into and engage in the recesses 52 which are provided for the reception thereof in the peripheral edge of the body 51 of the driving sprocket 47 and the driving of the endless conveyor chain or belt 27 is thus effected by the driving engagement of the anti-friction rollers 36 in the recesses 52 provided therefor in the peripheral edge of the body 51 of the driving sprocket 47. During this operation, that is to say, as the endless chain or belt 27 moves around the driving sprocket 47 the rolled or convoluted edge portions 32 and 33 of the depending end flanges 30 and 31, respectively, of the chain or belt link units or sections 28 do not enter into the recesses 52 in the driving sprocket 47 so that the hinge joints formed by the interconnected rolled edges 32 and 33 are not subjected to driving strains or stresses and function merely as hinges. Hence the depending end flanges 30 and 31 and the rolled edge portions 32 and 33 thereof are not apt to become distorted or bent in use under the stresses and strains incident to the driving operation as might occur if the rolled edge portions 32—33 which provide the hinge joints engaged directly in the recesses 52 in the driving sprocket 47, as in prior endless conveyor structures of a comparable character.

The arrangement of the head portions 39 of the anti-friction roller-supporting shafts 35 in the recesses 54 formed by the inwardly offset portions 42 and 43 of the depending side flanges 41 and the interconnecting link members or bars 42, respectively, together with the arrangement of these parts within the vertical side walls formed by the interconnected parts 20—21—17 and 16 of the side frame units 13 (Fig. 2) enhances the safety factor involved in the use of the new conveyor structure since these head portions 39 are thus disposed in a position such that the workers' hands and clothing are not apt to become caught therein. Moreover, this arrangement of the heads 39 of the anti-friction roller-supporting shafts 35 prevents these head portions from becoming engaged with stationary parts of the supporting frame 11 which might tend to happen if the heads 39 projected outwardly beyond the depending side flanges 41 of the endless conveyor link units or sections 28 and which would tend to exert bending stresses and strains upon the anti-friction roller-supporting shafts 35.

Moreover, the mounting of the anti-friction roller-supporting shafts 34 by the frictional engagement of the knurled inner end portions 34 thereof in the rolled edge portions 32 of the depending flanges 30 of the chain link units or sections 28 facilitates insertion and removal of the anti-friction roller-supporting shafts 34 and the mounting of the anti-friction rollers 36 thereon and their removal therefrom and the replacement and repair of these parts as and when necessary.

A modification of the hinge connection between the chain link units or sections embodied in the new conveyor structure is illustrated in Figs. 10 and 11 of the drawings, and those parts thereof which are similar to or correspond to parts embodied in the form of the invention illustrated in Figs. 1 to 9, inclusive, of the drawings have been given similar reference numerals followed by the additional and distinguishing reference character "a".

In the modified form of hinge connection between the link units or sections 28a, shown in Figs. 10 and 11, a single rolled edge hinge joint is provided and the rolled or convoluted edge portions 33 of the depending end flanges 31 are eliminated and each of the depending flanges 31a is merely provided at its lower end with a right angular flange or extension 45 which extends away from the adjacent depending end flange 30a at substantially a right-angle thereto (Fig. 10). However, each of the depending end flanges 30a is provided with a rolled or convoluted edge portion 32a which provides a housing and mounting for the knurled end portion 34a of one of the anti-friction roller-supporting shafts 35 frictionally fitted therein, as described hereinbefore in reference to the form of the invention illustrated in Figs. 1 to 9, inclusive, of the drawings.

It will thus be seen from the foregoing description, considered in conjunction with the accompanying drawings, that the present invention provides a new and improved and relatively inexpensive endless conveyor structure having the desirable advantages and characteristics, and accomplishing its intended objects, including those hereinbefore pointed out and others which are inherent in the invention.

What is claimed is:

1. A conveyor chain or belt comprising a plurality of link units or sections each including a deck portion having a depending flange at each end thereof, and in which each of the said depending flanges has a rolled lower edge portion, and in which the said rolled lower edge portions of the said depending flanges of each two adjacent link units or sections are interconnected to provide a generally tubular-shaped hinge connection between each two adjacent link units or sections, said deck portions having depending flanges at each side spaced from the ends of said end flanges and each side flange having apertures near its ends aligned with the tubular shaped hinge connections, shafts extending through the apertures in said flanges and into said tubular hinge connections, and anti-friction rollers supported on said shafts in said spaces.

2. A conveyor chain or belt having a row of spaced anti-friction rollers mounted thereon at each side thereof, the said endless belt or chain including a plurality of interconnected link units or sections each including a deck defining body having a pair of side flanges formed integral therewith and depending therefrom one at each side thereof, each of the said depending side flanges having an inwardly offset end portion and each of the said inwardly offset end portions being arranged in overlapping and parallel relationship with one of the said inwardly offset end portions on the next adjacent one of the said endless chain links or sections, each of the said endless chain link units or sections including depending end flanges each having a rolled or convoluted edge portion and each of the said rolled or convoluted edge portions on each of the said endless chain link units or sections being hingedly engaged in embracing and coaxial relationship with one of the said rolled or convoluted edge portions on the next adjacent one of the said chain link units or sections to provide a generally tubular-shaped hinge joint between each two adjacent chain link units or sections, and a shaft supporting each of the said anti-friction rollers and having a portion extending through each pair of the said inwardly offset portions and into one of the said generally tubular-shaped hinge joints.

3. A conveyor chain or belt as defined in claim 2 in which the portion of each of the said anti-friction roller supporting shafts which is disposed in one of the said tubular hinge joints has a knurled external surface which is frictionally fitted into the inner portion of a corresponding one of the said generally tubular hinge joints.

4. A conveyor chain or belt as defined in claim 2 in which the portion of each of the said anti-friction roller supporting shafts which is disposed in one of the said tubular hinge joints has a knurled external surface which is frictionally fitted into the inner portion of a corresponding one of the said generally tubular hinge joints, and in which each pair of the said inwardly offset portions of the depending side flanges of the said link units or sections provides a recess and in which each of the anti-friction roller-supporting shafts has a head portion at the outer end thereof disposed in one of the said recesses.

5. A conveyor chain or belt having a row of spaced anti-friction rollers mounted thereon at each side thereof and including a plurality of hingedly interconnected link units or sections each including a deck portion, a pair of depending side flanges arranged one at each side of the said deck portion, and a pair of depending end flanges arranged one at each end of the said deck portion, one of the said depending end flanges on each of the said link units or sections having a rolled and generaly tubular-shaped lower edge portion, the said depending side flanges on adjacent ones of the said link units or sections having inwardly offset and overlapping parallel end portions provided with aligned apertures, and a supporting shaft for each of the said anti-friction rollers, each of the said anti-friction roller-supporting shafts having an inner end portion projecting into and frictionally mounted in the outer end portion of the said generally tubular-shaped rolled edge portion of the depending side flange of a corresponding one of the said link units or sections.

6. A conveyor chain or belt as defined in claim 5 in which each of the said anti-friction roller-supporting shafts has a head portion disposed outwardly of the corresponding pair of the said inwardly offset and overlapping end portions of the said depending side flanges of said link units or sections, with the outer surfaces of the said head portions of the said anti-friction roller supporting shafts being disposed substantially in the plane of the outer edges of the body portions of the said depending side flanges.

7. A conveyor chain or belt as defined in claim 5 in which the hinge joint between each two adjacent ones of the said link units or sections is provided by a single one of the said generally tubular-shaped rolled edge portions in cooperation with a pair of said anti-friction roller-supporting shafts coaxially aligned with each other at opposite sides of the said endless chain or belt and each having a knurled inner end portion projecting into and frictionally mounted in the outer end portion of the said generally tubular-shaped rolled edge portion.

8. A conveyor chain or belt comprising a plurality of link units or sections, each including a deck portion having a depending flange at each end thereof, each of said depending flanges having rolled lower edge portions, said rolled lower edge portions of each two adjacent link units or sections being interconnected to provide a generally tubular-shaped hinge connection between each two adjacent link units or sections, said deck portions also having depending flanges at each side, the end portions of which at least are spaced from the adjacent ends of said end flanges and are each provided with an aperture aligned with the tubular-shaped hinge connections, anti-friction rollers in the spaces between said end portions and adjacent ends of said end flanges, shaft means extending through said apertures, rollers and into said tubular hinge connections for supporting said rollers, and link elements extending between and interconnecting said shaft means at each side of the belt and disposed between the rollers and the adjacent ends of said end flanges.

9. A conveyor chain or belt comprising a plurality of link units or sections, each including a deck portion having a depending flange at each end thereof, one of said depending flanges having a generally tubular rolled lower edge portion and the other with a reversely extending flange, said deck portions also having depending flanges at each side, the end portions of which at least are spaced from the adjacent ends of said end flanges and are provided with an aperture aligned with the tubular portion, anti-friction belt driving rollers in the spaces between said end portions and adjacent ends of said end flanges, shaft means extending through said apertures, rollers and into said tubular portions for supporting said rollers, and link elements extending between and interconnecting said shaft means at each side of the belt and disposed between the rollers and the adjacent ends of said end flanges.

10. A conveyor chain or belt comprising a plurality of link units or sections, each including a deck portion having depending side flanges, the end portions of each flange being inset and apertured, link elements located inwardly of each side flange and each having apertured end portions with the apertures therein aligned with the apertures in said side flanges, apertured rollers located between the flanges and link elements with their apertures in alignment with the apertures in the link elements and flanges, and shaft means extending through the aligned apertures and rollers for pivotally connecting the side flanges and links and supporting said rollers, said shafts having heads of a width approximately equal to said inset and being located in said inset portions.

11. A conveyor chain or belt comprising a plurality of link units or sections, each including a deck portion having depending side flanges, the end portions of each flange being apertured, link elements located inwardly of each side flange and each having apertured end portions with the apertures therein aligned with the apertures in said side flanges, apertured rollers located between the flanges and link elements with their apertures in alignment with the apertures in the link elements and flanges, and individual shafts each extending through a pair of aligned apertures and a roller for pivotally connecting the side flanges and links and supporting said rollers, and said deck portions having inner dependent structures secured to the inner ends of said shafts.

12. A conveyor chain or belt as claimed in claim 11, wherein said inner dependent structures comprise dependent flanges at corresponding ends of said deck portions, and wherein the opposite ends of the deck portions are provided with dependent flanges terminating in portions extending toward said first mentioned flanges.

13. A conveyor chain or belt comprising a plurality of link units or sections, each including a deck portion having a depending flange at each end thereof, at least one of said depending flanges having transverse tubular openings at opposite ends of said flange, said deck portions also having depending flanges at each side, the end portions of which are spaced outwardly from the adjacent ends of said one end flanges and are each provided with an aperture aligned with the associated tubular opening, rollers in the spaces between said end portions and adjacent ends of said one end flanges, shaft means extending through said apertures, rollers and into said tubular openings for supporting said rollers, and link elements extending between and interconnecting said shaft means at each side of the belt and disposed inwardly of said rollers.

DONALD KLINE.
EDWARD N. MICHNA.

REFERENCES CITED

The following references are of record in the file of this patent:

UNITED STATES PATENTS

| Number | Name | Date |
|---|---|---|
| 1,026,617 | Turnbull | May 14, 1912 |
| 1,140,923 | Turnbull | May 25, 1915 |
| 1,401,366 | Sargent | Dec. 27, 1921 |
| 1,507,832 | Henry | Sept. 9, 1924 |
| 1,556,562 | Hoddy | Oct. 6, 1925 |
| 1,787,984 | Hippenmeyer | Jan. 6, 1931 |
| 2,100,959 | Hurxthal | Nov. 30, 1937 |
| 2,428,507 | Webb | Oct. 7, 1947 |
| 2,430,720 | Kline et al. | Nov. 11, 1947 |

FOREIGN PATENTS

| Number | Country | Date |
|---|---|---|
| 19,810 | Great Britain | of 1903 |